(12) United States Patent
Finschi (10) Patent No.: US 9,764,923 B2
(45) Date of Patent: Sep. 19, 2017

(54) TRANSFERS IN MULTIPLE-DECK ELEVATOR SYSTEMS

(71) Applicant: Inventio AG, Hergiswil (CH)

(72) Inventor: Lukas Finschi, Ebikon (CH)

(73) Assignee: INVENTIO AG, Hergiswil (CH)

( * ) Notice: Subject to any disclaimer, the term of this patent is extended or adjusted under 35 U.S.C. 154(b) by 452 days.

(21) Appl. No.: 14/407,138

(22) PCT Filed: Jun. 11, 2013

(86) PCT No.: PCT/EP2013/062039
§ 371 (c)(1),
(2) Date: Dec. 11, 2014

(87) PCT Pub. No.: WO2014/001082
PCT Pub. Date: Jan. 3, 2014

(65) Prior Publication Data
US 2015/0158694 A1    Jun. 11, 2015

(30) Foreign Application Priority Data

Jun. 25, 2012 (EP) ..................... 12173379

(51) Int. Cl.
*B66B 1/20* (2006.01)
*B66B 1/24* (2006.01)
(Continued)

(52) U.S. Cl.
CPC .............. *B66B 1/2458* (2013.01); *B66B 9/00* (2013.01); *G05B 15/02* (2013.01);
(Continued)

(58) Field of Classification Search
CPC ... B66B 1/2458; B66B 9/00; B66B 2201/102; B66B 2201/103; B66B 2201/301; B66B 2201/306; B66B 2201/405; G05B 15/02
(Continued)

(56) References Cited

U.S. PATENT DOCUMENTS 5,719,360 A * 2/1998 Davis ........................ B66B 1/20
                                                    187/380
6,871,727 B2 * 3/2005 Jokela ....................... B66B 1/18
                                                    187/249
(Continued)

FOREIGN PATENT DOCUMENTS

EP    1418147 A1    5/2004
JP    2003040539 A  2/2003
(Continued)

*Primary Examiner* — Anthony Salata
(74) *Attorney, Agent, or Firm* — William J. Clemens; Shumaker, Loop & Kendrick, LLP (57) ABSTRACT

In an elevator system using multiple-deck elevator cars (130, 132), an elevator passenger (154) travels between a floor in a first zone (170) in a building (120) and a floor in a second zone (172) in the building (120). The passenger (154) travels first from one of the zones (170, 172) to a ground floor lobby (100, 101). Within a given amount of time after arriving at the lobby (100, 101), the identified passenger (154) is allowed to place an elevator call for an elevator traveling to the other zone (170, 172). Even if the call is for a destination floor not usually served from the particular ground floor lobby (100, 101), the passenger (154) is allowed to travel to the destination floor as requested.

15 Claims, 6 Drawing Sheets

(51) Int. Cl.
*B66B 9/00* (2006.01)
*G05B 15/02* (2006.01)

(52) U.S. Cl.
CPC ... *B66B 2201/102* (2013.01); *B66B 2201/103* (2013.01); *B66B 2201/301* (2013.01); *B66B 2201/306* (2013.01); *B66B 2201/405* (2013.01)

(58) Field of Classification Search
USPC ........ 187/247, 249, 380–389, 391, 393, 902
See application file for complete search history.

(56) References Cited

U.S. PATENT DOCUMENTS

| | | | | |
|---|---|---|---|---|
| 7,198,136 B2 * | 4/2007 | Urata | ........................ | B66B 9/00 187/249 |
| 7,258,203 B2 * | 8/2007 | De Jong | ............... | B66B 1/2458 187/383 |
| 7,392,884 B2 * | 7/2008 | Hikita | ................... | B66B 1/2433 187/249 |
| 7,537,089 B2 * | 5/2009 | Duenser | ................ | B66B 1/2466 187/247 |
| 7,694,781 B2 * | 4/2010 | Sorsa | .................... | B66B 1/2458 187/382 |
| 7,841,450 B2 * | 11/2010 | Smith | ...................... | B66B 1/18 187/249 |
| 8,132,652 B2 * | 3/2012 | Hakala | .................. | B66B 1/2458 187/249 |
| 2003/0000776 A1 | 1/2003 | Kostka | | |
| 2005/0077115 A1 | 4/2005 | Urata | | |

FOREIGN PATENT DOCUMENTS

| | | |
|---|---|---|
| JP | 2004307075 A | 11/2004 |
| WO | 2010012639 A1 | 2/2010 |
| WO | 2010081709 A1 | 7/2010 |

* cited by examiner

TRANSFERS IN MULTIPLE-DECK ELEVATOR SYSTEMS

FIELD

This disclosure relates to multiple-deck elevator systems.

BACKGROUND

Buildings that are served by double-deck elevator cars often have two ground-floor lobbies. From one of the ground-floor lobbies, even-numbered floors in the building can be reached; from the other ground-floor lobby, odd-numbered floors in the building can be reached. In some buildings with double-deck elevator cars, groups of one or more elevator cars serve respective zones of floors in the building. For example, a first group of elevator cars can serve a lower zone and a second group of elevator cars can serve an upper zone. If a passenger needs to travel from an even-numbered floor in one zone to an odd-numbered floor in the other zone, this usually requires the passenger to travel to one of the ground-floor lobbies, go to the other ground-floor lobby, and then travel to the destination floor with the elevator. Transferring between lobby floors can be inefficient and/or inconvenient.

US20030000776A1 describes a method for the selection of an elevator of an elevator installation having at least two groups, wherein a route with changeovers is available for reaching a destination floor from a start floor.

SUMMARY

Further options for passengers traveling between floors in multiple-deck elevator systems could be advantageous. This is addressed herein by at least some of the embodiments covered by the claims.

In various embodiments using multiple-deck elevator cars, an elevator passenger travels between a floor in a first zone in a building and a floor in a second zone in the building. The passenger travels first from one of the zones to a lobby. Then, within a given amount of time after arriving at the lobby, the passenger is allowed to place a call for an elevator traveling to the other zone. Even though the call is for a destination floor not usually served from that particular lobby, the passenger is allowed to travel to the destination floor as requested.

In some embodiments, an elevator system operation method comprises: transporting an identified passenger in a multiple-deck elevator car of a first elevator group from a first elevator zone in a building to a first lobby floor of the building, the building comprising the first lobby floor, a second lobby floor, a plurality of floors in the first elevator zone and a plurality of floors in a second elevator zone; receiving, from the identified passenger, within a time limit, and after the passenger's arrival at the first lobby floor, a call identifying a destination floor in the second elevator zone; and transporting the passenger in a multiple-deck car of a second elevator group from the first lobby floor to the destination floor. The destination floor can be a floor in the building that is not usually served by the second elevator group from the first lobby floor. The multiple-deck elevator car of the first elevator group can comprise a first double-deck elevator car and the multiple-deck elevator car of the second elevator group can comprise a second double-deck elevator car. In some cases, the first lobby floor is an even-numbered floor in the building and the destination floor is an odd-numbered floor in the building. In other cases, the first lobby floor is an odd-numbered floor in the building and the destination floor being an even-numbered floor in the building. Identifying information for the passenger can be received before transporting the passenger to the first lobby floor. Identifying information for the passenger can also be received before transporting the passenger to the destination floor in the second elevator zone. The time limit can be a set amount of time after the passenger places a call at a start floor in the first elevator zone. In other embodiments, the time limit is a set amount of time after the passenger's arrival at the first lobby floor. In some embodiments, the call identifying the destination floor in the second elevator zone is a destination call. In other embodiments, the call identifying the destination floor in the second elevator zone is a car call.

An embodiment of an elevator installation can comprise, for example: a first multiple-deck elevator car that serves a first lobby floor of a building, a second lobby floor of the building, and a plurality of floors in a first elevator zone of the building, the first multiple-deck elevator car being disposed in a first elevator shaft; a second multiple-deck elevator car that serves the first lobby floor of the building, the second lobby floor of the building and a plurality of floors in a second elevator zone of the building, the second multiple-deck elevator car being disposed in a second elevator shaft; and an elevator installation control computer programmed to cause the first multiple-deck elevator car to transport an identified passenger from the first elevator zone to the first lobby floor of the building, receive, from the identified passenger, within a time limit, and after the passenger's arrival at the first lobby floor, a call identifying a destination floor in the second elevator zone, and instruct the second multiple-deck elevator car to transport the passenger from the first lobby floor to the destination floor. The installation can further comprise a destination call input device coupled to the elevator installation control computer. The installation can further comprise an identification input device coupled to the elevator installation control computer, the identification input device being separate from the destination call input device.

In further embodiments, an elevator system operation method comprises: transporting an identified passenger in a multiple-deck elevator car of a first elevator group from a first elevator zone in a building to a first lobby floor of the building, the building comprising the first lobby floor, a second lobby floor, a plurality of floors in the first elevator zone and a plurality of floors in a second elevator zone; receiving a call identifying a destination floor in the second elevator zone; determining that the received call is from the identified passenger, was received within a time limit, and was received after the identified passenger's arrival at the first lobby floor; and as a result of the determining, transporting the identified passenger in a multiple-deck elevator car of a second elevator group from the first lobby floor to the destination floor.

In particular embodiments, the identified passenger is transported to the destination floor in a cabin of the multiple-deck elevator car of the second elevator group that does not usually serve the first lobby floor.

Further embodiments of an elevator installation comprise: a first multiple-deck elevator car that serves a first lobby floor of a building, a second lobby floor of the building, and a plurality of floors in a first elevator zone of the building, the first multiple-deck elevator car being disposed in a first elevator shaft; a second multiple-deck elevator car that serves the first lobby floor of the building, the second lobby floor of the building and a plurality of floors in a second elevator zone of the building, the second multiple-deck elevator car being disposed in a second elevator shaft; and an elevator installation control computer programmed to cause the first multiple-deck elevator car to transport an identified passenger from the first elevator zone to the first lobby floor of the building, receive a call identifying a destination floor in the second elevator zone, determine that the received call is from the identified passenger, was received within a time limit, and was received after the identified passenger's arrival at the first lobby floor, and as a result of the determining, cause the second multiple-deck elevator car to transport the identified passenger from the first lobby floor to the destination floor.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more optical disks, volatile memory components (such as DRAM or SRAM) and/or nonvolatile memory components (such as hard drives, Flash RAM or ROM). The computer-readable storage media do not cover pure transitory signals. The methods disclosed herein are not performed solely in the human mind.

DESCRIPTION OF THE DRAWINGS

The disclosure refers to the following figures, in which.

DETAILED DESCRIPTION

Figure 1:
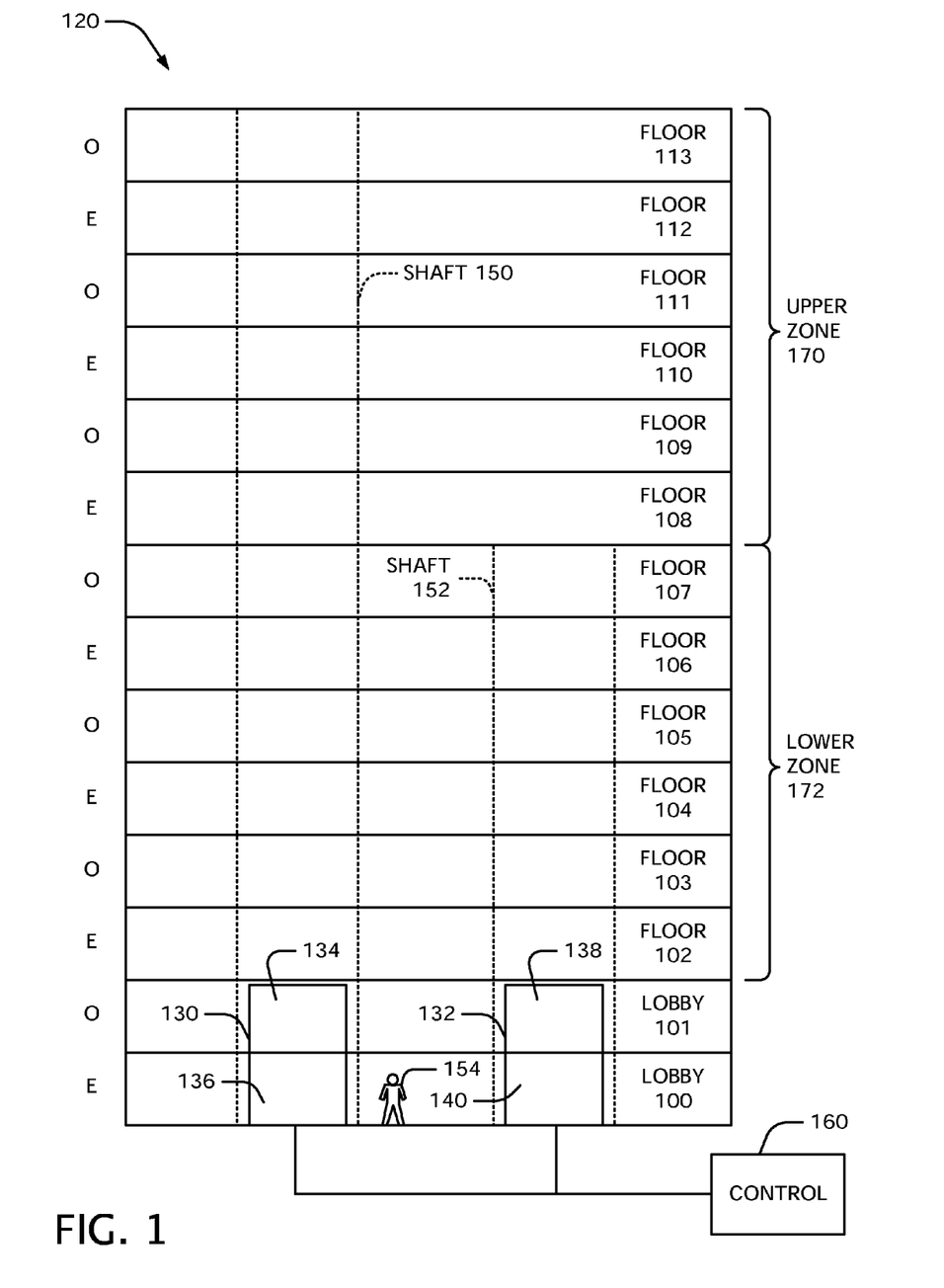
FIG. 1 shows an exemplary embodiment of a building served by an elevator installation.

FIG. 1 shows a block diagram of an exemplary embodiment of a building 120 that is served by an elevator installation. The building 120 comprises two lobby floors 100, 101 (also called "lobbies"). In the embodiment of FIG. 1, the lobbies 100, 101 are both ground-floor lobbies, meaning that people can enter and/or exit the building 120 from the lobbies 100, 101. In further embodiments, the lobbies 100, 101 are lobbies that are not ground-floor lobbies (e.g., sky lobbies). The elevator installation comprises two multiple-deck elevator cars 130, 132. In the depicted embodiment, the car 130 comprises two cabins 134, 136, which are arranged on top of each other. The car 132 comprises two cabins 138, 140, which are arranged on top of each other. That is, each of the cars 130, 132 is a double-deck car. In further embodiments, one or both of the cars 130, 132 comprises more than two cabins.

Although the disclosed technologies are generally described herein in the context of double-deck-car installations, any of the disclosed technologies can also be used with multiple-deck cars having more than two cabins, unless explicitly stated otherwise. In at least some embodiments, the disclosed technologies can be used in systems having multiple, separate cars that move in a common shaft.

The car 130 serves floors in the building 120 by moving through a shaft 150. The car 132 serves floors in the building 120 by moving through a shaft 152. Passengers can enter and exit the cars 130, 132 through cabin and hall doors (not shown). In the depicted embodiment, the cars 130, 132 each serve a respective group or "zone" of floors in the building 120. Specifically, the car 132 serves a lower zone 172 comprising floors 102, 103, 104, 105, 106 and 107, and the car 130 serves an upper zone 170 comprising floors 108, 109, 110, 111, 112 and 113. Since the car 132 does not serve the floors in the upper zone 170, the embodiment of FIG. 1 shows the shaft 152 as not extending into the floors of the upper zone 170. In some embodiments, the shaft 152 extends at least partially into the floors of the upper zone 170. In additional embodiments, additional cars (not shown) move within the shafts 150, 152 and/or within one or more additional shafts (not shown).

In at least some embodiments, each of the cars 130, 132 is assigned to a respective elevator group. Each group can comprise one or more elevator cars, possibly spread among multiple elevator shafts. In some cases, each group serves a specific area of the building (e.g., the upper zone 170 or the lower zone 172).

During "usual" operation of multiple-deck-car elevator installations, a passenger 154 can travel in the multiple-deck car directly between only some of the building floors. Generally, in a system where the multiple-deck car has x cabins arranged on top of each other, the passenger 154 can travel from a start floor (including a lobby) directly to a destination floor that is an integer multiple of x floors away. This is because the elevator car usually moves in increments of x floors. This limitation can help improve the efficiency of a multiple-deck-car elevator installation. To travel to a destination floor that is not a multiple of x floors away, the passenger 154 can, for example, use another route (e.g., stairs, escalator) to move to a start floor from which the multiple-deck car provides direct transportation to the destination floor.

For example, in the embodiment shown in FIG. 1, a passenger 154 can typically travel in a double-deck car 130, 132 directly between even-numbered floors or directly between odd-numbered floors. The passenger 154 is not typically allowed to travel with the car 130, 132 directly between an odd-numbered floor and an even-numbered floor. In FIG. 1, even-numbered floors are labeled with "E" and odd-numbered floors are labeled with "O." The even-numbered floors (including the lobby 100) are usually served by the lower cabin 136 of the car 130 and/or by the lower cabin 140 of the car 132. The odd-numbered floors (including the lobby 101) are usually served by the upper cabin 134 of the car 130 and/or by the upper cabin 138 of the car 132.

Designation of a floor as "even-numbered" or "odd-numbered" is not necessarily dependent upon the actual name or number assigned to the floor in descriptions of the building. Instead, a floor is considered even-numbered or odd-numbered based on which cabin of the double-deck car serves the floor during usual operation of the elevator system.

The elevator installation shown in FIG. 1 further comprises an elevator control unit 160. The control unit 160 is a computer-based device that is programmed to perform one or more of the method acts described herein. The control unit 160 is communicatively coupled to one or more other components in the elevator installation, such as the cars 130, 132, and to other components not shown here.

Figure 2:
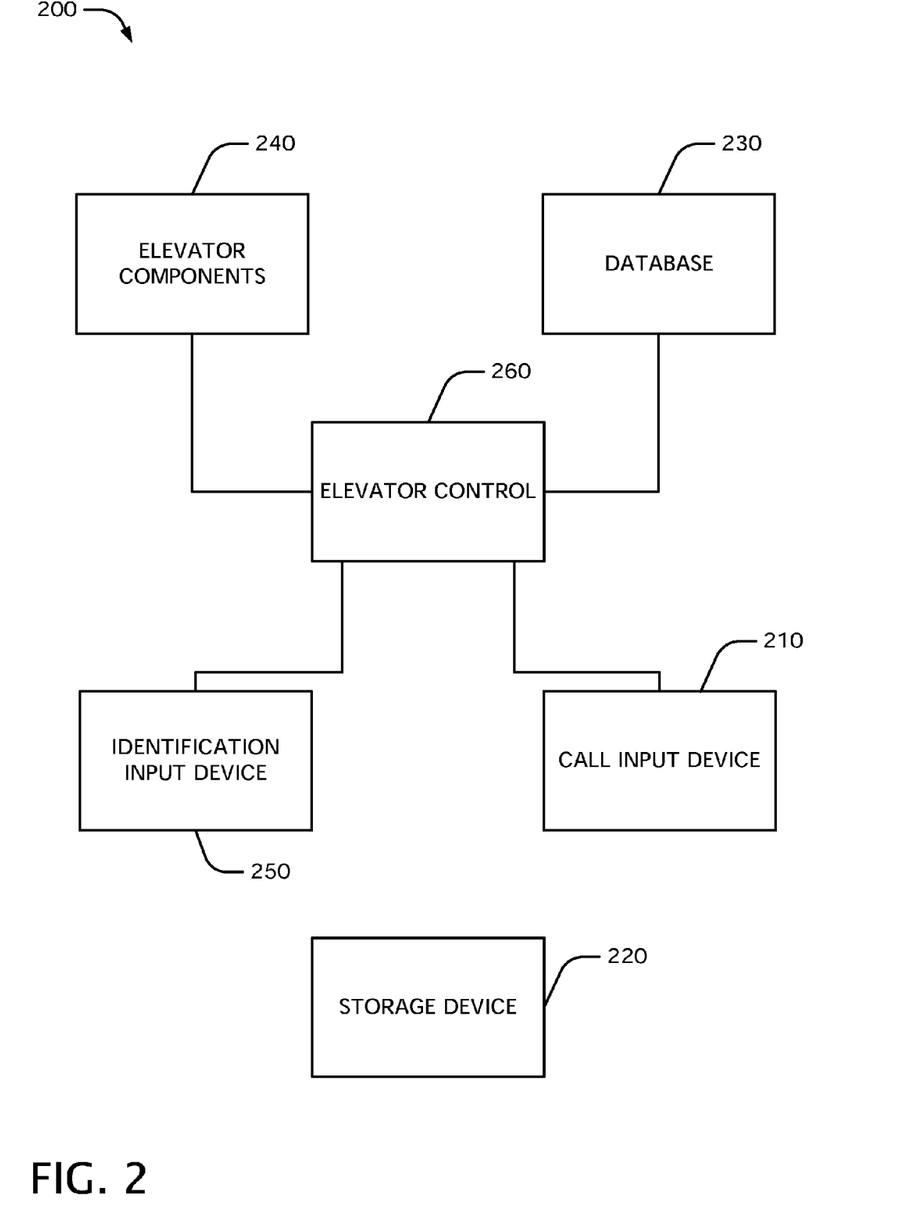
FIG. 2 shows a block diagram of an exemplary embodiment of an elevator system.

FIG. 2 shows a block diagram of an exemplary embodiment of an elevator system 200. An elevator control unit 260, which can be similar to the control unit 160, is a computer-based device that is programmed to perform one or more of the method acts described herein. Although the elevator control unit 260 is depicted as being a single component, the control unit 260 can also be implemented as two or more components that function together.

The elevator control unit 260 is coupled to one or more destination call input devices 210. In some embodiments, the call input devices 210 are arranged on one or more floors of a building (e.g., the lobbies 100, 101 and/or floors 102-113 of the building 120) and are configured to allow a destination for a user 154 to be determined before the user 154 enters the car 130, 132. Such technology is sometimes referred to as "destination call control."

Although at least some of the disclosed embodiments are described in the context of an elevator system that uses destination call control, further embodiments can be used with systems that use conventional call control (e.g., a user places a hall call before entering an elevator car and, after entering the car, indicates a destination floor by placing a car call). In embodiments using conventional call control, the call input devices 210 are arranged inside the elevator cars.

In some cases, a data storage device 220 is born by the user 154 and used to transmit to the elevator installation passenger-identifying information associated with the user 154. The passenger-identifying information is received by an identification input device 250, which is coupled to the elevator control unit 260. The data storage device 220 can comprise, for example: an RFID (radio-frequency identification) card, including near-field communication (NFC) devices and far-field communication devices; magnetic storage devices (e.g., magnetic strip cards); and/or optical code devices. (The passenger-identifying information is described in more detail below.) In additional embodiments, the identifying information is provided by the user 154 through another type of user interface (e.g., a keypad) on the identification input device 250.

In particular embodiments, the control unit 260 determines a destination for the user 154 based on the identifying information. In some embodiments, the destination is also determined based on information stored in the database 230 (described below). In further embodiments, the user 154 can input a destination using the call input device 210.

The call input device 210 and/or the identification input device 250 can be computer-based. The input devices 210, 250 can each comprise one or more input/output components, for example, a display, a touch screen, a wireless receiver and/or transmitter (based on, for example, Bluetooth technology, NFC technology, and/or RFID technology), a speaker, a microphone and/or a camera. The input devices 210, 250 can each be a stationary or semi-stationary device placed in a hallway, inside a room (e.g., in an apartment or office), or in another location in or near the building 120. The input devices 210, 250 can also each be at least partially implemented in a portable electronic device (e.g., a mobile telephone, a portable computer, a smartphone, a laptop, a personal digital assistant). In some cases, the input devices 210, 250 each comprise a personal computer connected to a network.

In some embodiments, the identification input device 250 and the call input device 210 are combined into one device. For example, a single device can receive both passenger identification information and call input information.

The elevator control unit 260 is also coupled to one or more additional elevator components 240. The components 240 can include, for example: components that control movements of the elevator system 200 (e.g., movements of doors, movements of cars); sensor components; and/or components that control aspects of the elevator system environment (e.g., lighting, heating, air conditioning and/or multimedia).

In further embodiments, the elevator control unit 260 is coupled to one or more databases 230. The databases 230 generally store information that can be used in operating the elevator system 200. Such information can comprise, for example, information about passengers (e.g., passenger preferences, names, which floors passengers are allowed to travel to, default destination floor information, handicapped status, and/or VIP status), information about operation schedules of the system 200 and/or other information.

Figure 3:
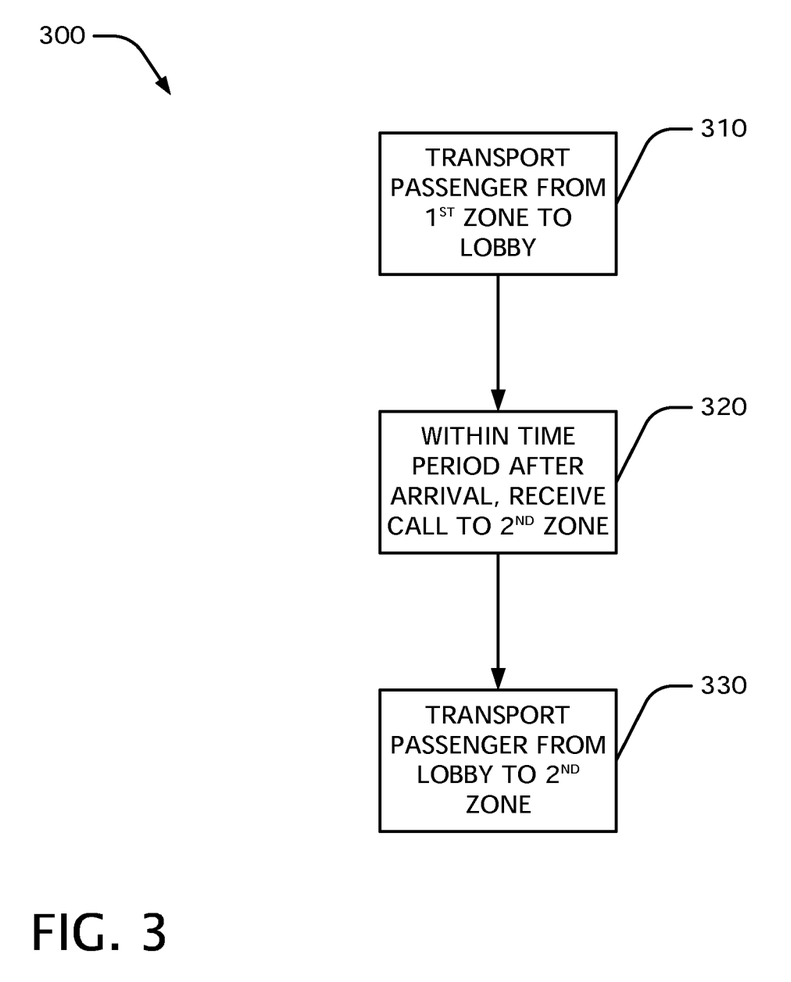
FIG. 3 shows a block diagram of an exemplary embodiment of a method for operating an elevator installation.

FIG. 3 shows a block diagram of an exemplary embodiment of a method 300 for operating an elevator installation having multiple-deck cars that move passengers between lobby floors and different zones in a building. In a method act 310, a passenger is transported from a floor in a first zone of the building to a lobby. The passenger is identified by the elevator system prior to this method act. As used in this application and in the claims, "identifying" a passenger means that the elevator system receives passenger-identifying information that allows the system to distinguish the passenger from one or more other passengers for at least a given amount of time. The passenger-identifying information can include, for example: a number; a string; a passenger name; a biometric passenger feature; and/or another piece of information. In different embodiments, the identifying information can be provided to the elevator installation in various ways. For example, the information can be provided by a data storage device (e.g., the data storage device 220) through an identification input device (e.g., the identification input device 250). In further embodiments, the identifying information can be provided through a camera or biometric reader.

In a method act 320, the elevator system receives a call for the passenger (e.g., a car call in a conventional call control system, or a destination call in a destination call control system). The call is placed within a given time period. The time period can be, for example, 1 minute, 2 minutes, 5 minutes, 10 minutes or another amount of time. The time period can be, for example, an amount of time after the passenger's arrival at the lobby. The time period can also be measured relative to one or more other events, for example, when the passenger's elevator trip starts in the first zone, or when the passenger places the first call for the trip from the first zone. In some embodiments, the time period is set as a fixed amount of time. In some embodiments, the time period is different for different passengers. The time period can also be adjusted, either by the passenger and/or by another party. The time period can be based in part on, for example, a distance or typical walking time from a point of arrival in the lobby to a point of call registration in the lobby. In particular embodiments, the time period is based on an actual or approximate position of the passenger in the lobby. The actual or approximate position can be determined based on one or more sensors, for example, an RFID sensor, an infrared sensor, a video sensor and/or another type of sensor. The time period can also be based on a type of call input device available to the passenger (e.g., the time can be longer or shorter if the passenger is using a personal mobile device to input a call).

The call is for a trip from the lobby to a destination floor in a second zone in the building. The destination floor can be a floor that is usually served by the elevator from that lobby, or it can be a floor that is not usually served by the elevator from that lobby. For example, using the elevator system depicted in FIG. 1, the passenger could travel from the lobby 101 (an odd-numbered floor) to an odd-numbered floor in the upper zone or to an even-numbered floor in the upper zone, despite the fact that usually only odd-numbered floors can be reached from the lobby 101.

In at least some embodiments, if the passenger does not provide a call from the lobby floor within the given time period after the passenger's arrival at the lobby, then the passenger is not allowed to place a call to a floor that is not usually served from that lobby floor. Placing a time limit on the passenger's ability to place such a call can reduce uncertainty for the elevator system in scheduling passengers trips (e.g., after the time limit expires without receiving such a call, the elevator system does not need to consider the fact that the passenger may place such a call).

Based on identifying information that is also provided to the elevator system at the lobby-floor level, the elevator system recognizes that the call for the destination in the second zone has been placed by the same passenger who was recently transported from the first zone to the lobby.

In a method act 330, the passenger is transported by the elevator system from the lobby to the indicated destination floor in the second zone.

Although in the above description of the method 300 the passenger's identification information is provided to the elevator system before the call information, in some embodiments the call information can be provided before the identification information.

Figure 4:
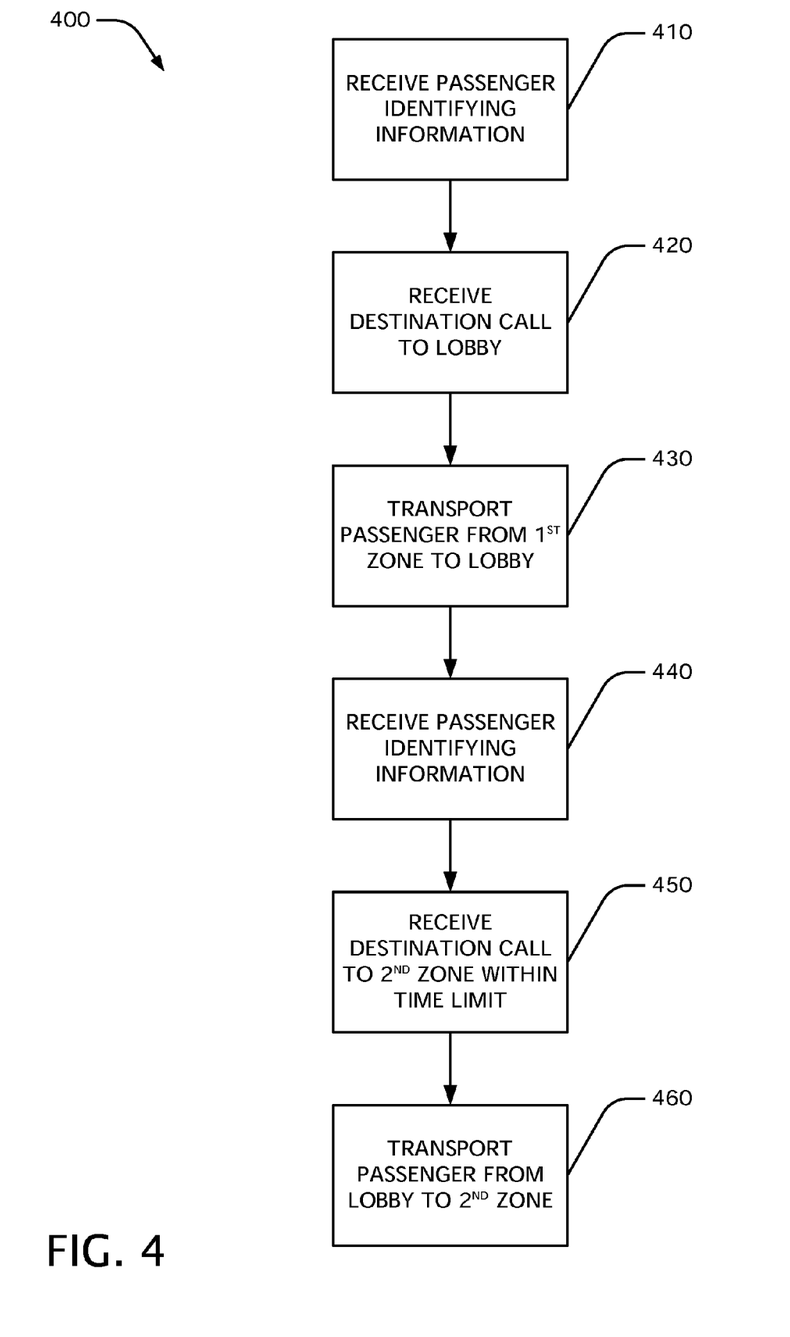
FIG. 4 shows a block diagram of an exemplary embodiment of a method for operating an elevator installation.

FIG. 4 shows a block diagram of an exemplary embodiment of a method 400 for operating an elevator installation having multiple-deck cars that move passengers between lobby floors and different zones in a building. The method 400 is discussed in the context of the elevator system 200, but it can also be used with other embodiments of multiple-deck-elevator systems. The method 400 is described in the context of an elevator system that uses destination call control, but further embodiments can be used with conventional call control systems.

In a method act 410, the elevator control unit 260 receives passenger-identifying information for a passenger who is on a floor (the "start floor") in a first elevator zone in the building. In particular embodiments, the identifying information is received through the identification input device 250. In a method act 420, the elevator control unit 260 receives destination call information for the passenger. The destination call information indicates that the passenger wishes to travel from the start floor in the first elevator zone to the lobby floor that can usually be reached from that start floor. In particular embodiments, the destination call information is received through the call input device 210. Although the method acts 410, 420 are shown as separate, successive acts, in some embodiments they are performed simultaneously or as a single act. In some embodiments, the method act 420 is performed before the method act 410.

In a method act 430, the elevator system 200 transports the passenger from the start floor to the lobby floor identified in the destination call. In a method act 440, the elevator control unit 260 again receives passenger-identifying information, this time from the lobby floor to which the passenger has recently traveled. The elevator control unit 260 can, for example, compare the two sets of passenger-identifying information. The passenger identifying information can be provided through, for example, another call input device located at the lobby floor. In a method act 450, the elevator control unit 260 receives a destination call for the passenger. The destination call is placed within a given time period after the passenger's arrival at the lobby. The time period can be, for example, 1 minute, 2 minutes, 5 minutes, 10 minutes and/or another amount of time. The destination call is for a trip from the lobby to a destination floor in a second zone in the building. The destination floor can be a floor that is usually served by the elevator from the lobby, or it can be a floor that is not usually served by the elevator from the lobby. Although the method acts 440, 450 are shown as separate, successive acts, in some embodiments they are performed simultaneously or as a single act. In some embodiments, the method act 450 is performed before the method act 440.

In at least some embodiments, if the passenger does not provide a destination call from the lobby floor with the given time period after the passenger's arrival at the lobby, then the passenger is not allowed to place a destination call to a floor that is not usually served from that lobby floor.

In a method act 460, the passenger is transported by the elevator system from the lobby to the indicated destination floor in the second zone.

In at least some embodiments, any passenger using the elevator system may travel between zones in a building using methods such as the methods 300, 400. In further embodiments, the use of such methods is limited to one or more passengers. The passengers who may use such methods can be determined based on, for example, a list. In additional embodiments, use of such methods is limited to certain time periods (e.g., certain times of the day, certain days of the week). Use of such methods can also be limited to travel to and/or from certain building floor. Use of such methods can be limited to travel to and/or from certain building zones. In some cases, use of the methods is limited based on one or more conditions of the elevator system (e.g., waiting times, number of passenger calls, number of elevators in operation and/or other conditions). Use of such methods can also be restricted by one or more authorities. For example, a building manager can indicate at a selected time that the elevator system should stop allowing passengers to use such methods. In particular embodiments, two or more of the above criteria can be used to determine whether a passenger may use methods such as the methods 300, 400.

Figure 5:
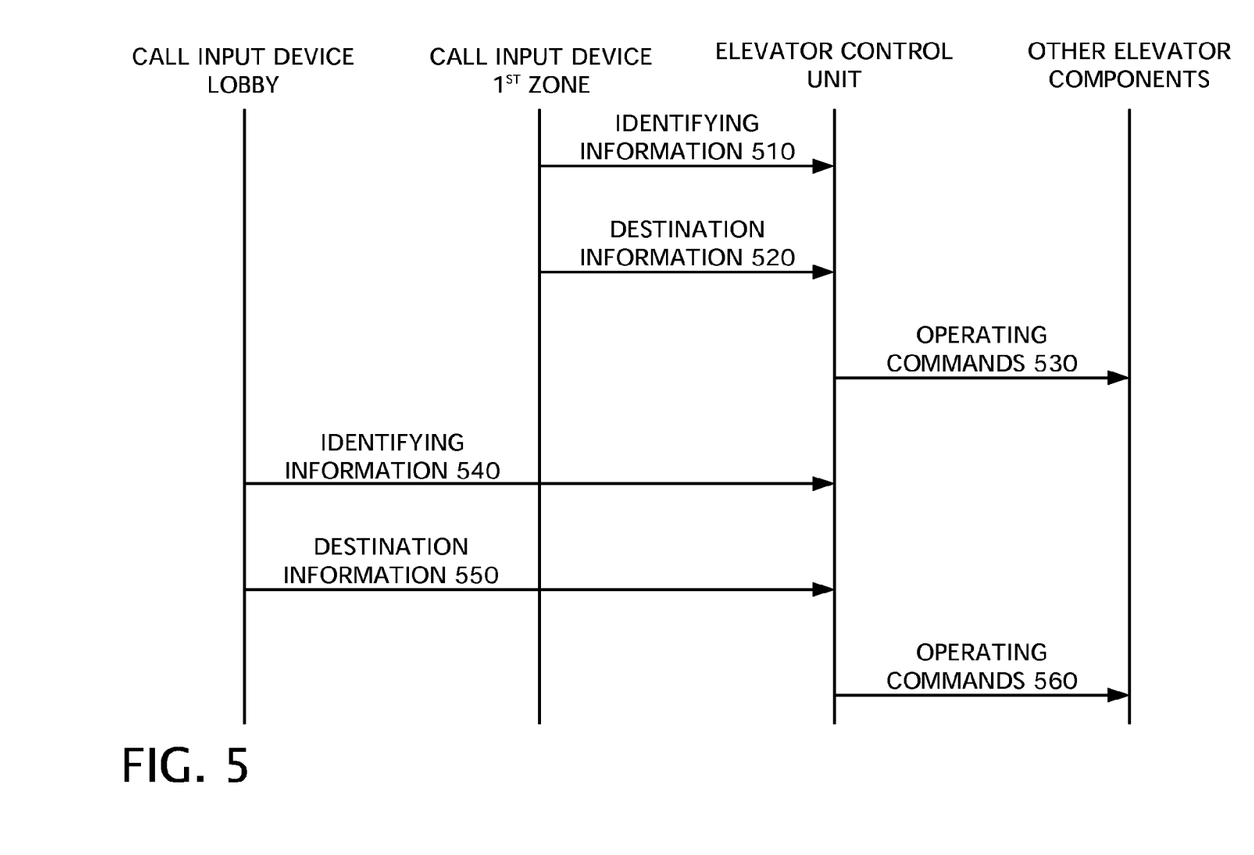
FIG. 5 depicts an exemplary embodiment of signal exchanges that can occur using one or more of the disclosed methods.

FIG. 5 depicts an exemplary embodiment of signal exchanges between various components that can occur using one or more of the disclosed methods. Although the signals are depicted in FIG. 5 as being single signals (e.g., each shown by a single arrow), in various embodiments one or more of the signals can comprise multiple signals. The embodiment of FIG. 5 is discussed in the context of an elevator system that uses destination call control; a system using conventional call control would use some of the same signals.

A signal 510, containing passenger-identifying information for a passenger wishing to travel from a start floor in a first zone in a building, is sent from a call input device on the start floor in the first zone to an elevator control unit. A signal 520, containing destination information for the passenger's elevator trip, is sent from the call input device in the first zone to the elevator control unit. In some embodiments, the signals 510, 520 are separate signals; in further embodiments, the signals 510, 520 are combined. A signal 530 is sent from the elevator control unit to other elevator components to cause the elevator system to transport the passenger from the start floor in the first zone to the lobby floor that can usually be reached from the start floor.

After the passenger reaches the lobby floor, a signal 540, containing identifying information for the passenger, is sent from a call device on the lobby floor to the elevator control unit. A signal 550, containing destination information for the passenger's elevator trip to a floor in a second zone in the building, is sent from the call input device on the lobby floor to the elevator control unit. In some embodiments, the signals 540, 550 are separate signals; in further embodiments, the signals 540, 550 are combined. A signal 560 is sent from the elevator control unit to other elevator components to cause the elevator system to transport the passenger from the lobby floor to the destination floor in the second zone of the building.

Figure 6:
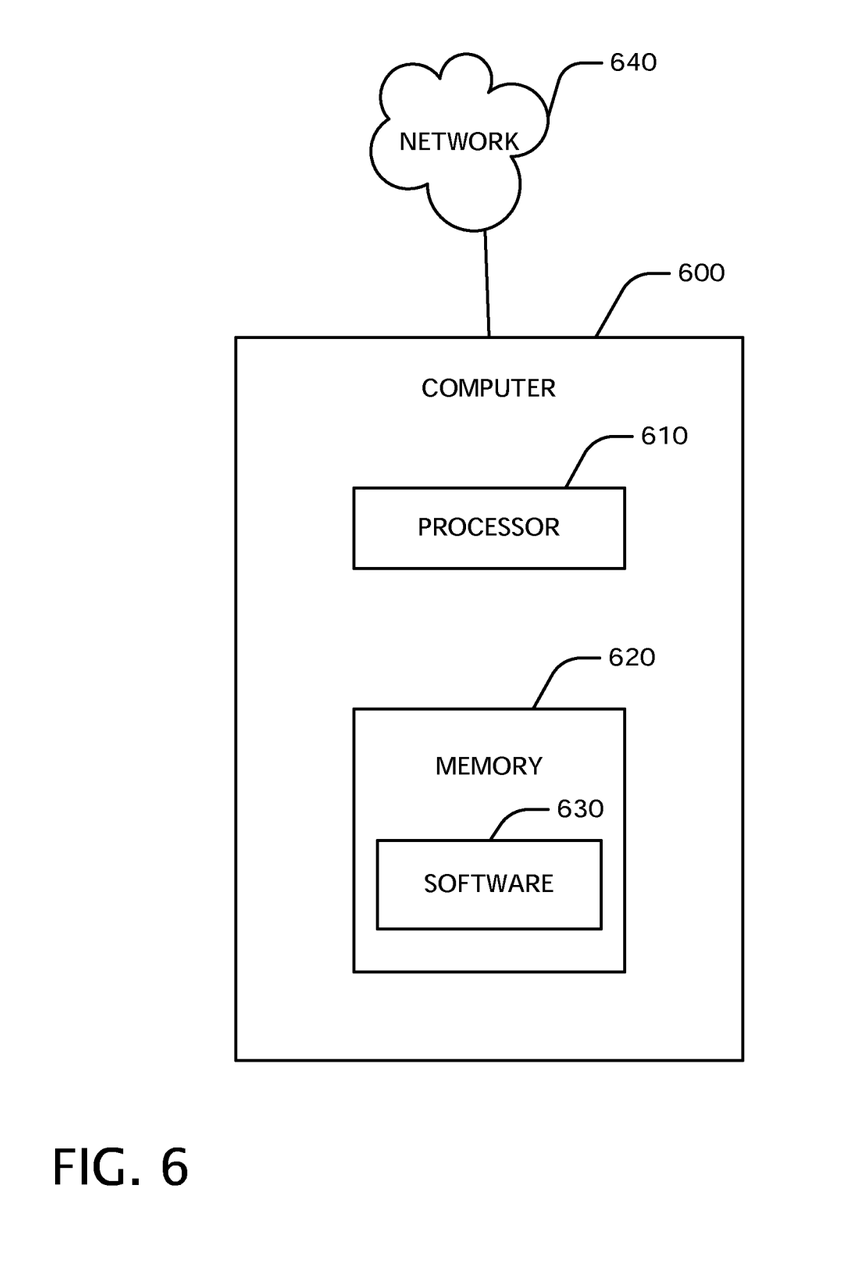
FIG. 6 shows a block diagram of an exemplary embodiment of a computer.

FIG. 6 shows a block diagram of an exemplary embodiment of a computer 600 (e.g., part of an elevator control unit, part of a call input device, part of an identification input device, part of a portable electronic device) that can be used with one or more technologies disclosed herein. The computer 600 comprises one or more processors 610. The processor 610 is coupled to a memory 620, which comprises one or more computer-readable storage media storing software instructions 630. When executed by the processor 610, the software instructions 630 cause the processor 610 to perform one or more method acts disclosed herein. Further embodiments of the computer 600 can comprise one or more additional components. The computer 600 can be connected to one or more other computers or electronic devices through an input/output component (not shown). In at least some embodiments, the computer 600 can connect to other computers or electronic devices through a network 640. In particular embodiments, the computer 600 works with one or more other computers, which are located locally and/or remotely. One or more of the disclosed methods can thus be performed using a distributed computing system.

In various embodiments, one or more method acts disclosed herein are performed by the elevator control unit 160, 260. In further embodiments, one or more method acts are performed by one or more other computer-based components (e.g., a call input device).

At least some embodiments of the disclosed technologies can allow for more flexible operation of multiple-deck elevator systems. For example, a passenger can travel from a floor in a first zone of the building to a floor in the second zone in the building without having to move from one lobby to another. This can generally provide more convenience for the passenger, particularly if, for example, the passenger has difficulty moving between the lobbies (e.g., the passenger is handicapped), the passenger is in a hurry, changing lobbies would require passing between secure areas and/or the passenger is accompanied by a large or awkward object. In some embodiments, since relatively few passengers place calls from a lobby floor to a floor not usually served from that lobby floor, the efficiency offered by the multiple-deck elevator system is not degraded or is not seriously degraded by using the disclosed technologies. At least some embodiments are relatively simple and/or cost-effective because, for example, a display is not needed in the elevator car to show the passenger, during the trip from the first zone, the elevator car that the person should catch at the lobby floor. (Some embodiments comprise displays in elevator cars for other purposes.)

At least some embodiments of the disclosed technologies can allow elevator users to more easily travel between elevator zones in a building without significantly affecting the efficient operation of the multiple-deck elevator system.

The system can be used by people who, for example, do not necessarily have a "VIP" status that would afford them other privileges, such as generally being able to travel with the elevator between even- and odd-numbered floors with a given elevator zone. In at least some cases, allowing all users to travel at will with the elevator between even- and odd-numbered floors (even within a zone) would degrade performance of the multiple-deck elevator system. Limiting the time during which a passenger can place a call from the lobby to the second zone can help to limit misuse of the disclosed technologies. Additionally, when an identified passenger travels from a first zone to a lobby, the elevator control can recognize that the passenger may intend to travel to a floor in a second zone that is not usually served from the lobby. The elevator system can then plan its handling of one or more other calls accordingly.

Following is a non-limiting example of a passenger's use of an elevator system that operates according to one or more of the disclosed embodiments. The elevator system uses a first group of double-deck elevator cars to serve a first zone of floors in the building and a second group of double-deck elevator cars to serve a second zone of floors in the building. From a start floor in the first zone, the passenger presents an RFID card to a call input device on the floor. This allows the elevator installation to identify the passenger. The passenger's final destination floor is actually in the second zone in the building and thus served by the second elevator group. But first, the passenger uses the call input device to request travel to a lobby floor. The elevator system transports the passenger to the lobby floor. The start floor is an even-numbered floor (floor 10) that is usually served by the lower cabin of the elevator car and thus usually directly accessible from the lower lobby floor. Accordingly, the elevator car brings the passenger to the lower lobby floor. After arriving at the lobby floor, the passenger again provides identification information and then places a destination call for the final destination floor within a two-minute window. The final destination floor is floor 21, which is in the second zone and, being an odd-numbered floor, is usually not served from the lower lobby floor. However, the elevator system makes an exception for the passenger and brings the passenger directly to floor 21 from the lower lobby floor. If the elevator system had not made such an exception, the passenger would have needed to move from the lower lobby floor to the upper lobby floor (using, for example, stairs or an escalator), which would have been less convenient for the passenger.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act and/or one method act can be divided into two or more method acts.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope of these claims.

The invention claimed is:

1. An elevator system operation method, the elevator system being in a building having a first lobby floor, a second lobby floor, a first plurality of floors in a first elevator zone and a second plurality of floors in a second elevator zone, the elevator system having a first multiple-deck elevator car of a first elevator group movable in the first elevator zone and a second multiple-deck elevator car of a second elevator group movable in the second elevator zone, comprising the steps of:
   transporting an identified passenger in the first multiple-deck elevator car from a start floor in the first elevator zone to the first lobby floor;
   receiving a call identifying a destination floor in the second elevator zone;
   determining that the received call is from the identified passenger, was received within a predetermined time limit, and was received after arrival of the identified passenger at the first lobby floor; and
   as a result of the determining, transporting the identified passenger in the second multiple-deck elevator car from the first lobby floor to the destination floor.

2. The elevator system operation method according to claim 1 wherein the destination floor is a floor in the building that is not usually served by the second elevator group from the first lobby floor.

3. The elevator system operation method according to claim 1 wherein the first multiple-deck elevator car is a first double-deck elevator car and the second multiple-deck elevator car is a second double-deck elevator car.

4. The elevator system operation method according to claim 1 wherein the first lobby floor is an even-numbered floor in the building and the destination floor is an odd-numbered floor in the building.

5. The elevator system operation method according to claim 1 wherein the first lobby floor is an odd-numbered floor in the building and the destination floor is an even-numbered floor in the building.

6. The elevator system operation method according to claim 1 including receiving identifying information for the identified passenger before transporting the identified passenger to the first lobby floor.

7. The elevator system operation method according to claim 6 including receiving additional identifying information for the identified passenger before transporting the identified passenger to the destination floor in the second elevator zone.

8. The elevator system operation method according to claim 1 wherein the predetermined time limit is a set amount of time after the identified passenger arrives at the first lobby floor.

9. The elevator system operation method according to claim 1 wherein the predetermined time limit is a set amount of time after the identified passenger places a call at the start floor in the first elevator zone.

10. The elevator system operation method according to claim 1 wherein the call identifying the destination floor in the second elevator zone is a destination call.

11. The elevator system operation method according to claim 1 wherein the call identifying the destination floor in the second elevator zone is a car call.

12. The elevator system operation method according to claim 1 wherein the identified passenger is being transported to the destination floor in a cabin of the second multiple-deck elevator car usually serve the first lobby floor.

13. An elevator installation, comprising:
   a first multiple-deck elevator car that serves a first lobby floor of a building, a second lobby floor of the building, and a first plurality of floors in a first elevator zone of the building, the first multiple-deck elevator car being disposed in a first elevator shaft;
   a second multiple-deck elevator car that serves the first lobby floor of the building, the second lobby floor of the building and a second plurality of floors in a second elevator zone of the building, the second multiple-deck elevator car being disposed in a second elevator shaft; and
   an elevator installation control computer programmed to,
      cause the first multiple-deck elevator car to transport an identified passenger from a start floor in the first elevator zone to the first lobby floor,
      receive a call identifying a destination floor in the second elevator zone,
      determine that the received call is from the identified passenger, was received within a predetermined time limit, and was received after the passenger arrives at the first lobby floor, and
      as a result of the determining, cause the second multiple-deck elevator car to transport the identified passenger from the first lobby floor to the destination floor.

14. The elevator installation according to claim 13 including a destination call input device coupled to the elevator installation control computer for generating the call.

15. At least one computer-readable storage media having encoded thereon instructions that, when executed by a computer, cause the computer to perform a method, the method comprising:
   transporting an identified passenger in a first multiple-deck elevator car of a first elevator group from a first elevator zone in a building to a first lobby floor of the building, the building having the first lobby floor, a second lobby floor, a first plurality of floors in the first elevator zone and a second plurality of floors in a second elevator zone;
   receiving a call identifying a destination floor in the second elevator zone;
   determining that the received call is from the identified passenger, was received within a predetermined time limit, and was received after the identified passenger arrived at the first lobby floor; and
   as a result of the determining, transporting the identified passenger in a second multiple-deck elevator car of a second elevator group from the first lobby floor to the destination floor.

* * * * *